United States Patent [19]

Klausz

[11] Patent Number: 4,749,257
[45] Date of Patent: Jun. 7, 1988

[54] RADIOLOGICAL INSTALLATION WITH ADJUSTABLE TRANSMISSION OPTICAL ATTENUATOR

[75] Inventor: Remy Klausz, Neuilly sur Seine, France

[73] Assignee: Thomson CGR, Paris, France

[21] Appl. No.: 852,705

[22] Filed: Apr. 16, 1986

[30] Foreign Application Priority Data

Apr. 19, 1985 [FR] France .................. 85 06008

[51] Int. Cl.$^4$ .................. G02F 1/13; H05G 1/64; H04N 5/32
[52] U.S. Cl. .................. 350/331 R; 350/345; 350/337; 350/333; 378/99; 358/111
[58] Field of Search .......... 350/333, 337, 345, 331 R; 358/111; 378/99

[56] References Cited

U.S. PATENT DOCUMENTS

| | | | |
|---|---|---|---|
| 3,622,786 | 11/1971 | Walker | 378/99 |
| 4,215,365 | 7/1980 | Haendle et al. | 358/111 |
| 4,272,782 | 6/1981 | Proper et al. | 358/111 |
| 4,472,826 | 9/1984 | van de Ven | 358/111 |
| 4,517,594 | 5/1985 | Horbaschek | 358/111 |
| 4,606,064 | 8/1986 | Haendle | 358/111 |
| 4,612,572 | 9/1986 | Komatsu et al. | 378/99 |

FOREIGN PATENT DOCUMENTS 0209273 12/1983 Japan .................. 358/111

OTHER PUBLICATIONS

W. S. Colburn et al., "Photoconductor-Thermoplastic Image Transducer", Jul.-Aug. 1978, Optical Engineering/vol. 17, No. 4.

*Primary Examiner*—Stanley D. Miller
*Assistant Examiner*—Trong Quang Phan
*Attorney, Agent, or Firm*—Cushman, Darby & Cushman

[57] ABSTRACT

A radiological installation with dynamic compensation in the optical path of the image, with an optical attenuator with locally adjustable transmission placed at least in the vicinity of a focal plane in which the radiological image is formed situated upstream of the television camera of the image acquisition chain.

10 Claims, 2 Drawing Sheets

RADIOLOGICAL INSTALLATION WITH ADJUSTABLE TRANSMISSION OPTICAL ATTENUATOR

BACKGROUND OF THE INVENTION

1. Field of the Invention

The invention relates to a radiological installation having means for compressing the dynamics of the radiological image for making better use of the dynamics proper to the image acquisition means, such more especially as a television camera.

2. Description of the Prior Art

In medical radiology, in particular in the field of vascular radiology, it is often desirable to be able to compress the overall contrast of the radiological image so as to be able to reveal certain details. In fact, such dynamic compression then allows the grey scale of the image acquisition means to be fully used. For that, acting on the path of the X rays is known by disposing, between the X ray source and the patient, X ray absorbing elements whose characteristics compensate at least partially for the differences of attenuation in the object. An image resulting from this treatment is then acquired by the display chain and known image subtraction processing may then be applied under good conditions. More precisely, a reference image is taken and stored, for example before injection of a contrast product. It is then subtracted systematically from the following ones so that the circulatory arborescence invaded by the contrast product appears with very great clearness. All of this processing gives good results but requires considerable and expensive electronic means with risks of prolonged exposure to the X rays not only for the patient but also for the person who handles the absorbing elements, during the period of adjustment thereof.

There is also known the technique of "unsharp mask" perfected for radiographic films. This method consists in making a reverse print of the film and superimposing the two prints for the final proof thus achieving a certain dynamic compression. The invention proposes more particularly transposing this concept, using means of a different kind, in a radiological installation comprising means for optical transmission between an output screen of a radiological image receiver (for example a luminance amplifier) and image acquisition means (for example a television camera). The basic idea of the invention consists then in carrying out the dynamic compensation processing in the optical path of the image (by generating therein a sort of unsharp mask), upstream of the acquisition means whose proper dynamics would be too limited for precise acquisition of low contrasts.

SUMMARY OF THE INVENTION

To this end, the invention relates then essentially to a radiological installation of the type comprising optical transmission means between an output screen of a radiological image receiver and bidimensional image sensor, such as a television camera, said optical transmission means comprising a system of lenses or objectives for picking up the visible image delivered by said output screen and reforming it on said bidimensional sensor, further comprising an optical attenuator with adjustable transmission in at least a certain number of zones, inserted in said optical transmission means and placed at least in the vicinity of a focal plane of said lens or objective system where a real image is formed of said visible image and means for adjusting the transmission of each of said zones as a function of the amount of light received thereby.

The optical attenuator may be in very different forms. A photochromic glass plate, similar to those used in the spectacle industry, may for example be used. These components require considerable light energy in order to be correctly "impressed", so in this case means must be provided for momentarily increasing the brightness of the transmitted image. On the other hand, once the transmission of the plate has been adjusted at each of its points, as a function of the brightness of the image formed on this plate, the high "optical inertia" of such a component is transformed into an advantage to the extent that, for example, there is then sufficient time for observing the evolution of a contrast product, without the attenuation characteristics of the plate, defined by the pre-illumination thereof, having time to change appreciably.

Known systems may also be used, comprising essentially two associated components, respectively a variable attenuation plate, comprising more particularly liquid crystals and a photoconducting material plate applied to the variable attenuation plate and polarized by a voltage source, for adjusting at all points the transmission of the variable attenuation plate as a function of the amount of light received locally. In this case, the relative rapidity of response of this type of device is more suitable for processing isolated images. We can however come back to the preceding case by slightly offsetting the assembly of these two plates from the focal plane in which the above mentioned real image is formed. Thus a new type of unsharp mask is obtained which limits the dynamics of the resulting image at the low spatial frequencies thereof. Consequently, the finest details of the image and more particularly the circulatory arborescence, to take the preceding example, appear much more clearly since they correspond to the high spatial frequencies of the image concerned by the dynamic compression effected.

Furthermore as attenuator a mosaic of attenuating cells with electric control may be used, for example liquid crystals. In this case, each cell is driven by independent means, particularly photosensitive sensors (photodiodes) arranged in a similar flat mosaic and placed at least in the vicinity of an auxiliary plane where a real image is formed of said invisible image. One advantage of this system resides in the fact that the values delivered by the photosensitive sensors for a given mask forming image may be stored and the attenuation configuration of the attenuating cell mosaic may be "frozen" for a whole series of images taken subsequently. The resolution of the mask (dimensions of the attenuating cells) may be comparable to that of the image. It may be much coarser, each attenuating cell being associated with a more or less large zone of the image. In this case, offsetting of the attenuating cell mosaic from the focal plane will allow attenuation more especially of the defects resulting from the poor resolution of the mask.

BRIEF DESCRIPTION OF THE DRAWINGS

The invention will be better understood and other advantages thereof will be clearer from the following description of several possible embodiments of an installation conforming to its principle, given solely by way of example and with reference to the accompanying drawings in which.

DESCRIPTION OF THE PREFERRED EMBODIMENT

Figure 1:
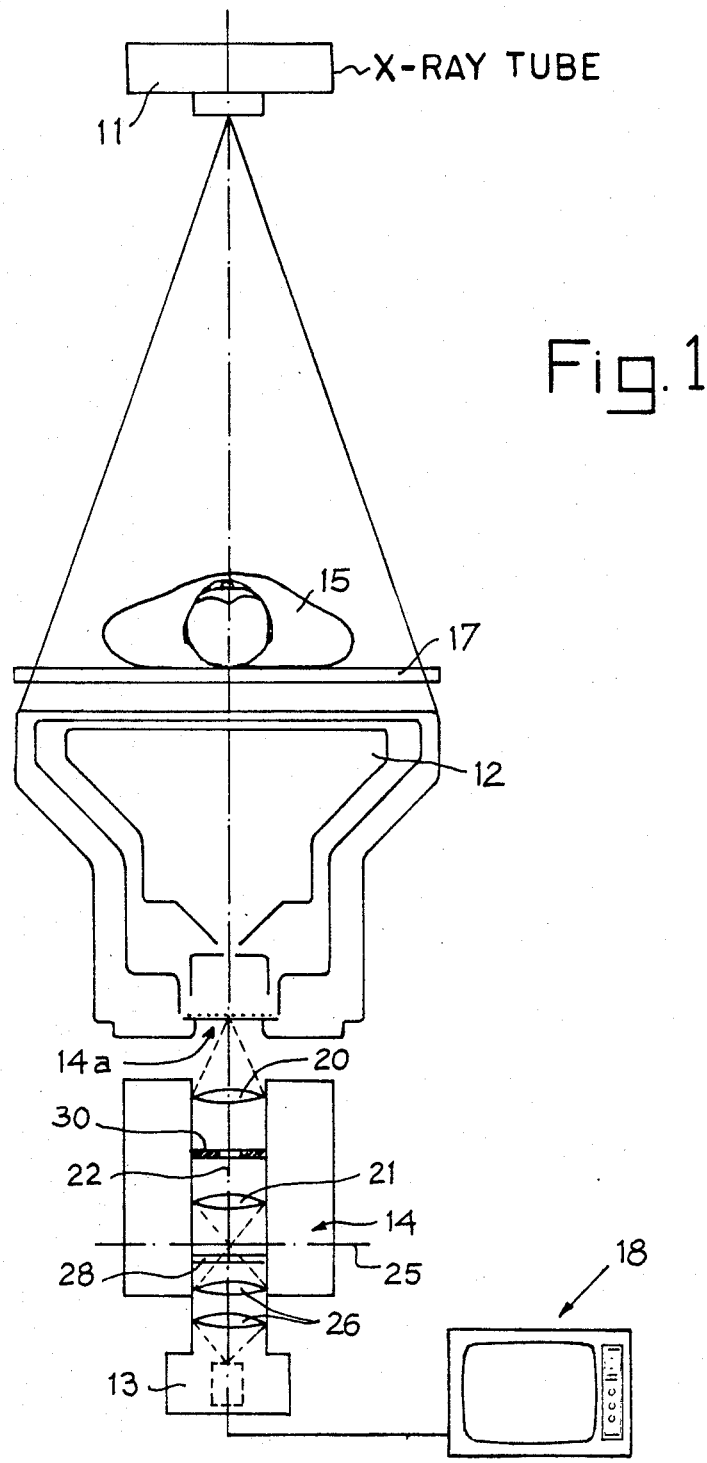
FIG. 1 is a schematical view of a radiological installation incorporating a first embodiment of the invention.

Referring to the drawings, FIG. 1 shows a radiological installation which comprises, conventionally, an X ray generating tube 11, a receiver formed here by a luminance amplifier 12, a television camera 13 and optical transmission means 14 inserted between an output screen 14a of amplifier 12 and camera 13. The body 16 to be represented is placed on a table 17 between the generating tube 11 and the luminance amplifier which gives a visible image thereof taken up by the optical transmission system then by the television camera 13. The video signal delivered by this latter is transmitted to a television receiver 18. More precisely, the optical transmission means 14 comprises two lenses or objectives 20, 21 having a common optical axis 22. The lens or objective 20 is disposed so that its focal plane merges with the plane of screen 14a so as to give an image "at infinity" thereof which is taken up by the lens or objective 21 which forms a real image thereof in a plane 25. The objective 26 of the camera takes up this real image and reforms it on the target of the scanning tube of the television camera 13. The arrangement of the above described optical transmission means is specific to the invention since it defines a plane 25 in which is placed an optical attenuator 28 with locally adjustable transmission. This latter is therefore inserted in said optical transmission means 14 and placed more particularly in the focal plane 25 where a real image is formed of the radiological image taken from the output screen 14a. As mentioned above, attenuator 28 may be slightly offset from said focal plane and its position along axis 22 may moreover be adjustable. In the example of FIG. 1, the attenuator is formed by a photochromic glass plate. The local attenuation control of this attenuator is therefore optical and is performed by the, image itself since the attenuation at each point of the photochromic plate increases with the amount of light received at this point. As mentioned above, the low sensitivity and the "inertia" of the photochromic glasses at present known require a pre-illumination device for "impressing" the attenuator, previous to a period of use. This may be obtained for example by opening as wide as possible an iris diagram 30, centered on the optical axis 22 and placed in the "at infinity" path of the optical transmission means, i.e. between the two lenses or objectives 20, 21. During the pre-illumination time, the scanning tube of the camera may be protected by a mechanical or electrooptical shutter or else by cutting offits own beam. The whole series of images following the pre-illumination benefits then from the same compensation because of the relatively long time required by such a material to return to equilibrium.

Figure 2:
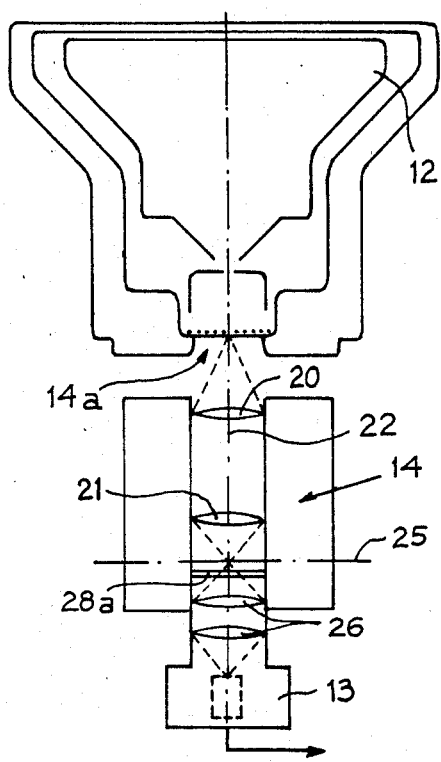
FIG. 2 is a partial schematical view of a similar installation incorporating a second embodiment of the invention.
Figure 3:
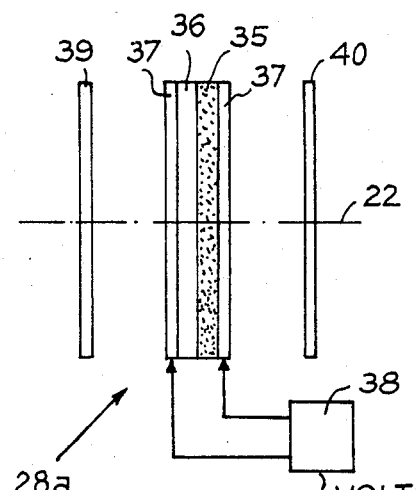
FIG. 3 is a detailed schematical view of the attenuator used in the installation of FIG. 2.

FIG. 2, in which similar structural elements bear the same numerical references, illustrates an installation of the same type in which the attenuator 28a is still of the type with direct optical control by the image itself, but formed essentially of the association of a variable attenuation plate, for example liquid crystals, and a transparent plate of a photoconducting material. Such systems have for example been described in an article appearing in the review "Optical Engineering" vol. 17, N° 4 of July 1978. For the contemplated application to radiology, the arrangement may be as shown in FIG. 3, comprising a plate 35 of material having electro-optical properties (for example in the form of liquid crystals of the formula $Bi_{12}$, $SiO_{20}$) to which is applied a photoconducting plate 36. These two plates are inserted between two transparent electrodes 37 for applying a bias voltage provided by a voltage source 38. This assembly is placed at least in the vicinity of the focal plane 25 and is inserted in a polarizing 39-analysing 40 system. The maximum attenuation of this attenuator may be adjusted as a function of the voltage applied. In all cases, however, the pre-illumination system may be avoided. As mentioned above, if it is desired to observe the evolution of a relatively long phenomenon greater than the response time of the attenuator, the position of the assembly of the two plates 35, 36 may be offset from the focal plane 25.

Figure 4:
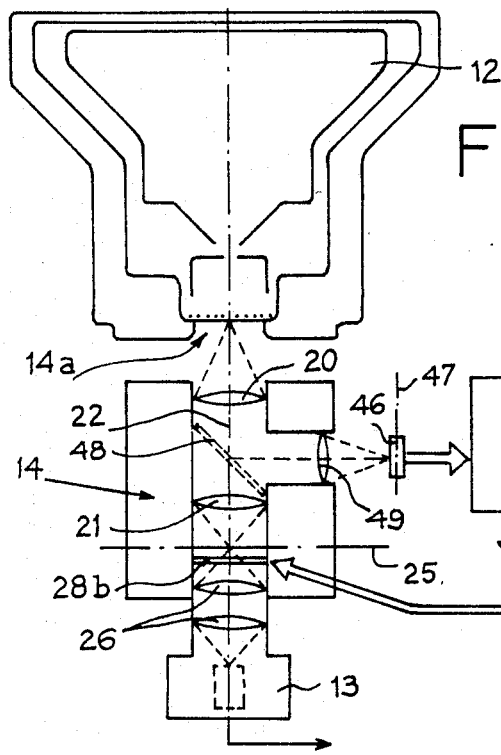
FIG. 4 is a schematical partial view illustrating a third embodiment of the invention.
Figure 5:
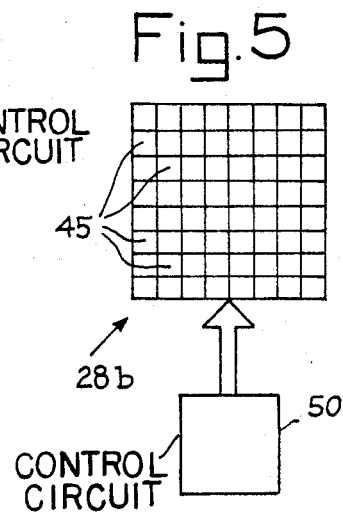
FIG. 5 illustrates schematically the attenuator of FIG. 4 and its control means.

FIG. 4 illustrates another type of attenuator in a similar installation. In this case, the attenuator 28b is formed of a mosaic of liquid crystal attenuating cells 45 (FIG. 5) which are driven individually by electric control means comprising, as input sensors of the photosensitive components 46, for example photodiodes arranged in a mosaic similar to the attenuating cell mosaic, placed in an auxiliary plane 47 where a real image is formed of the image delivered by the output screen 14a of the luminance amplifier 12, or else in the vicinity of this plane. In the example described, the optical transmission means 14 comprise a semitransparent mirror 48 oriented at 45° with respect to axis 22 and disposed in the "at infinity" portion of the optical path, as well as a lense or objective 49 disposed for receiving the light reflected by this mirror and for forming a real image in the auxiliary plane 47. Under certain operating conditions, in fact, the transmission coefficients of the cells 45 depend on the control voltages which are applied thereto. As mentioned above, the definition of the mask defined by the mosaic may be relatively coarse if it is offset slightly from the focal plane 25. The control means 50 between the photodiodes 46 and the attenuating cells 45 comprise advantageously a memory capable of storing the whole of the information representative of the signals delivered by the photodiodes 46, for "freezing" the configuration of a reference image forming a mask for a whole sequence of observations. The system of FIGS. 4 and 5 may be modified. The mosaic of the photodiodes 46, (as well as mirror 48 and objective 49) may in fact be omitted and, in this case, a reference image may be taken at the beginning of examination by camera 13 itself if all the attenuating cells have been previously driven so as to present momentarily the same attenuation. This reference image is then scanned by zones corresponding to the definition of the mask defined by the mosaic and the corresponding control values are stored in the memory of the electric control means 50.

What is claimed is:

1. A radiological installation of the type comprising optical transmission means between an output screen of a radiological image receiver and a bidimensional image sensor, said optical transmission means comprising a system of optical element means for picking up the visible image delivered by said output screen and reforming it on said bidimensional image sensor, wherein an optical attenuator is further provided with adjustable transmission in at least a plurality of zones, inserted in said optical transmission means and placed at least in the vicinity of a focal plane of said optical element means where a real image of said visible image is formed and further comprising means for adjusting the transmission of each said zone as a function of the amount of light received thereby.

2. The radiological installation as claimed in claim 1, wherein said adjustable attenuator is formed essentially of a device forming a light control attenuating plate sensitized by the image itself.

3. The radiological installation as claimed in claim 2, wherein said attenuating plate device comprises a photochromic glass and said optical transmission means further comprise means for momentarily increasing the brightness of said real image.

4. The radiological installation as claimed in claim 3, wherein said means for momentarily increasing the brightness of said real image comprises an iris diaphragm placed in said optical transmission means in a "at infinity" portion of the optical path of said image.

5. The radiological installation as claimed in claim 2, wherein said attenuating plate device comprises, a first electrically driven plate of the variable attenuation type and a second plate of a photoconducting material biased by a voltage source, said second plate being applied to said first plate.

6. The installation as claimed in claim 5, wherein said first plate is a liquid crystal component.

7. The radiological installation as claimed in claim 1, wherein said adjustable attenuator comprises a mosaic of attenuating cells, for example liquid crystal cells, and means for electrically controlling each of said cells.

8. The radiological installation as claimed in claim 7, wherein said electric control means comprise, as driving members, photosensitive sensors arranged in a mosaic at least in the vicinity of an auxiliary plane where a real image of said visible image is formed.

9. The installation as claimed in claim 8, wherein said optical transmission means comprises a semitransparent mirror placed in an "at infinity" portion of the optical path of said image and an optical element means disposed for receiving the light reflected by this mirror and for forming a real image in said auxiliary plane.

10. The radiological installation as claimed in claim 8, wherein said electric control means comprise means for storing information representative of the signals delivered by said photosensitive sensors for a chosen reference image.

* * * * *